United States Patent [19]

Fouchey, Jr.

[11] 4,264,082
[45] Apr. 28, 1981

[54] STAIR CLIMBING CART

[76] Inventor: Charles J. Fouchey, Jr., 1816 Michigan Blvd., Lincoln Park, Mich. 48146

[21] Appl. No.: 23,975

[22] Filed: Mar. 26, 1979

[51] Int. Cl.³ .............................................. B62B 5/02
[52] U.S. Cl. .................................... 280/5.26; 188/22; 188/31
[58] Field of Search ............... 280/5.26, 5.2, 47.27, 280/DIG. 10; 180/8 A; 188/22, 17, 31

[56] References Cited

U.S. PATENT DOCUMENTS

| 651,286 | 6/1900 | Williams | 188/22 |
| 1,191,394 | 7/1916 | Brown et al. | 280/5.26 |
| 1,615,942 | 2/1927 | Grow | 280/47.27 X |
| 2,706,640 | 4/1955 | Marshall | 280/5.26 |
| 3,063,730 | 11/1962 | Domoradzki | 280/47.27 X |

Primary Examiner—John A. Pekar
Attorney, Agent, or Firm—Cullen, Sloman, Cantor, Grauer, Scott & Rutherford

[57] ABSTRACT

A hand truck is disclosed including unique wheel assemblies for supporting the truck and permitting it to move heavy loads up and down a flight of stairs. Each assembly having three wheels mounted in an equilateral triangle configuration for providing mechanical advantage in moving a load upstairs and braking action when moving the load downstairs. The axle for the wheel assemblies is rotatably mounted to the downwardly extending leg portions of a generally U-shaped heavy metal shroud which is fixed to the upright frame of the hand truck. The hand truck is provided with a locking mechanism for locking the wheel assemblies in a set position including sprockets having a plurality of locking positions mounted on the axle adjacent each wheel assembly. A spring biased lock bar is mounted in the shroud above the sprockets, and it is released for locking engagement with the sprockets by a handle and control linkage mounted to the truck frame thereby holding the truck in a desired inclined position.

2 Claims, 6 Drawing Figures

STAIR CLIMBING CART

BACKGROUND OF THE INVENTION

The present invention relates to hand trucks intended for transporting heavy merchandise, and more particularly, to an improved and simplified hand truck which is adapted to move heavy loads easily up and down a flight of stairs.

A problem with prior art hand trucks or carrying carts is that it is difficult for the operator to keep the truck under control when going down a flight of stairs, and it is even more difficult to move heavy loads up a flight of stairs because the operator is substantially pulling the load and the truck. It is common to have a braking device operable to help prevent the truck from running away during its movement down the stairs. Other devices such as conveyor belt type treads, motors, lever means, etc., have been devised to assist the operator in moving the cart up a flight of stairs. These prior art attempts to make a hand truck more easily movable up and down stairs involve complicated mechanical structure which is susceptible to breakage, jamming, and other mechanical problems. Thus, there has been the need for a simplified hand truck which is adapted to move easily up and down a flight of stairs.

Another problem with existing hand trucks and carrying carts is that they are unsatisfactory for transporting heavy merchandise around a warehouse or the like. The trucks typically have a pair of ground engaging wheels which wear quickly because of the heavy loads bearing downwardly directly on the wheels. The wheels develop flat spots and other irregularities on their exterior surfaces which make it difficult for the operator to maneuver the truck after extended use. Thus, there has been a need for a hand truck or carrying device which is constructed to enable an operator to handle heavy loads. The invention herein seeks to solve the problems of the prior art by means of a hand truck which is capable of transporting heavy items around a warehouse, up and down flights of stairs, etc. The hand truck herein may be manufactured inexpensively, and it is designed to carry heavy loads without breaking or damaging its component parts. Thus, the present hand truck effectively eliminates the problems of the prior art.

SUMMARY OF THE INVENTION

The invention herein contemplates a hand truck or carrying device comprising an upright frame composed of a pair of laterally spaced side rails formed with handle portions at one end and feet portions at the other end secured together by a cross member to form a rest for supporting a load when the side rails are tilted about a horizontal axis. A generally U-shaped heavy metal shroud having downwardly extending leg portions is fixed to and covers a portion of the spaced rails. A transverse axle is secured between the downwardly extending leg portions of the shroud for mounting the ground engaging wheel assemblies which are secured to the outer ends of the axle.

An important feature of the invention is the ground engaging wheel assemblies which support the hand truck. Mounted to each protruding end of the axle are three rubber-tired wheels mounted in an equilateral triangle configuration. The wheels are rotatably supported on the ends of Y-shaped support members having legs of equal length. Lines connecting the rotational axes of the wheels form an equilateral triangle. The entire assembly is pivotally attached at the center or hub of the Y-shaped support members to the outer end of the axle.

There are always two wheels engaging the ground on each side of the hand truck of the present invention which permit the truck to transport heavy loads easily. When ascending a flight of stairs, the triangular wheel assembly rotates in a climbing motion such that the truck and load thereon move in an arc from one step to the next. An operator using typical hand truck must pull the truck and load up the vertical riser onto a horizontal tread when ascending a flight of stairs. This is awkward and requires substantial effort because the operator is pulling at an incline and the truck must move vertically.

In the present invention, as the operator pulls the truck up the stairs, a first wheel is pulled against a vertical riser and continued pulling causes the wheel assembly to rotate about the first wheel as a fulcrum bringing a second wheel into engagement with the horizontal tread of the next step. Thus, the operator does not lift the entire load because the lower wheel, acting as a fulcrum for the load, provides a mechanical advantage in moving the load in an arc-like motion upstairs. While descending stairs, a braking action occurs because the rotating wheel assembly pushes back against the load to break the downward descent of the truck. Thus, the present wheel assembly provides mechanical advantage in moving the load upstairs and braking action when moving the load downstairs.

Another feature of the present invention resides in the locking mechanism for holding the truck in a set position. Secured on the axle adjacent each wheel assembly is a sprocket having a plurality of locking positions for the wheel assembly. A transverse, horizontal lock bar is mounted in the truck frame above the sprockets. It is normally biased out of engagement with the sprockets by a handle and control linkage mounted to the upper end of the truck frame. Rotation of the handle releases the control linkage which permits the locking bar to be spring biased downwardly into locking engagement with the sprockets and thereby hold the truck in a set position.

Other advantages and meritorious features of the present invention will be more fully appreciated from the following detailed description and the appended claims.

DETAILED DESCRIPTION OF THE INVENTION

Figure 1:
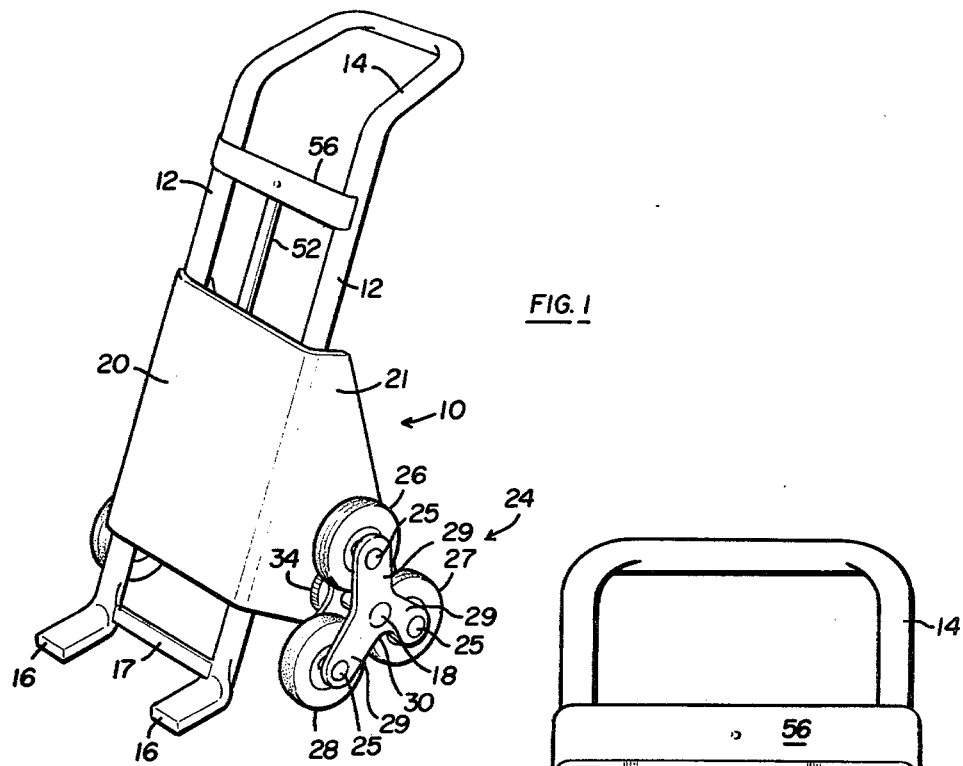
FIG. 1 is a perspective view of the present hand truck illustrating the triangular wheel assemblies.
Figure 2:
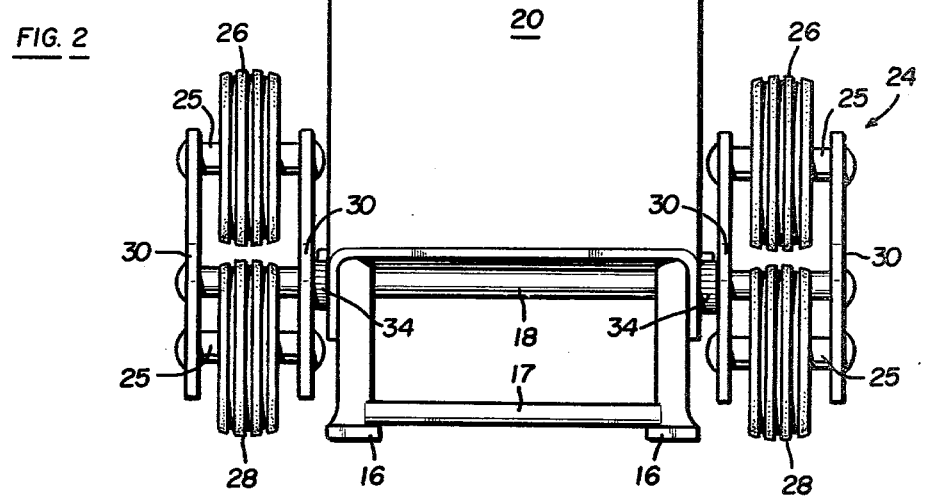
FIG. 2 is a front elevational view of the hand truck illustrated in FIG. 1.
Figure 3:
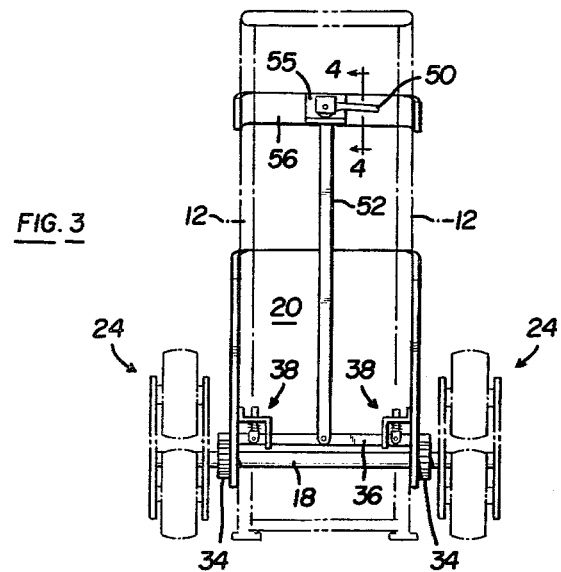
FIG. 3 is a partial rear view of the hand truck illustrating the locking mechanism for holding the wheel assemblies in place.
Figure 4:
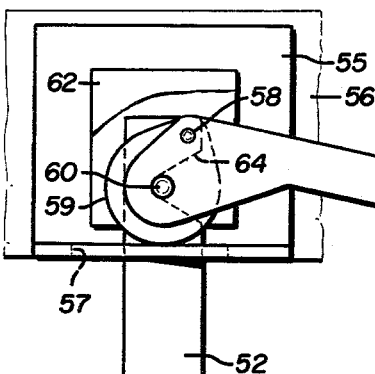
FIG. 4 is a partial cross-sectional view taken along line 4—4 in FIG. 3 to illustrate the locking handle.

FIG. 1 illustrates the hand truck device herein which is intended for transporting heavy loads and which is adapted to move the heavy loads easily up and down a flight of stairs. The hand truck 10 comprises an upright frame having a pair of laterally spaced side rails 12. The side rails are formed with handle portions 14 at one end and feet portions 16 at the other end secured together by a cross member 17 to form a rest for supporting a load when the side rails 12 are tilted about a horizontal axis 18. A generally U-shaped heavy metal shroud 20 is fixed to and covers a portion of the spaced rails 12. The shroud has downwardly extending leg portions 21, and a transverse horizontal axle 18 is secured between the downwardly extending leg portions of the shroud for mounting ground engaging wheel assemblies 24.

The generally U-shaped shroud 20 is secured to the side rails 12 by welding, and the shroud 20 and rails 12 serve to support the load when the side rails are tilted horizontal to the ground. The downwardly extending leg portions 21 of the shroud 20 are trapezoidal in shape to mount the wheel assemblies 24 a distance rearwardly of the side rails 12 which is sufficient to prevent the load from rubbing or engaging against the wheels of the wheel assemblies 24.

An important feature of the present invention resides in the ground engaging wheel assemblies 24 which support the hand truck. Each wheel assembly 24 includes three rubber-tire wheels 26, 27, and 28 mounted in an equilateral triangle configuration. The wheels 26, 27 and 28 are rotatably supported on pivot shafts 25 mounted between the ends 29 of Y-shaped support members 30. The legs 29 of the support members 30 are of equal length, and lines connecting the rotational axes 25 of the wheels form an equilateral triangle. Each wheel assembly 24 is pivotally attached at the center or hub of the Y-shaped support members to the outer end of the axle 18.

As illustrated in FIG. 1, there are always two wheels engaging the ground on each side of the hand truck which permits the truck to transport heavy loads easily. When ascending a flight of stairs, the triangular wheel assemblies 24 rotate in a climbing motion such that the truck and load move in an arc from one step to the next. As the operator is pulling the truck up a flight of stairs, the truck is angled and the operator is pulling at an incline. A first wheel 27 is pulled against a vertical riser and continued pulling causes the wheel assembly 24 to rotate clockwise about the first wheel 27 as a fulcrum bringing a second wheel 26 into engagement with the horizontal tread of the next step. Thus, the operator does not lift the entire load because the lower wheel 27 on the flight of stairs acts as a fulcrum for the load to swing it in an arc, thereby providing a mechanical advantage in moving the load upstairs.

When descending the stairs, a braking action occurs because the rotating wheel assembly 24 pushes back against the load to brake the downward descent of the truck. As the truck is moved down the flight of stairs, the wheel assembly 24 rotates counter-clockwise such that a wheel 28 swings downwardly to engage the next lower horizontal tread, thereby supporting the load and braking the downward descent of the truck. Thus, the present wheel assembly 24 provides mechanical advantage in moving the load upstairs and braking action when moving the load downstairs.

Another important feature of the present invention resides in the locking mechanism illustrated in FIGS. 3–6 for holding the truck in a set position. Sprockets 34 are fixed on the axle 18 adjacent and inwardly of each wheel assembly 24. Each sprocket 34 has a plurality of locking positions for holding the truck in a set inclined position. A transverse, horizontal lock bar 36 is mounted in slots 37 extending through the downwardly extending legs 21 of shroud 20 above the sprockets 34. Each end of the lock bar 36 is spring biased for engagement with the sprocket 34 by spring biasing assemblies 38.

The spring biasing assemblies 38 include U-shaped bracket supports 39 mounted to the inside walls of downwardly extending legs 21. The ends of lock bar 36 pass through slots 40 in the brackets 39 and then through slots 37 in the downwardly extending legs 21 of shroud 20. Slots 37 and 40 are elongated to permit the lock bar sufficient vertical movement so as to move into and out of engagement with sprockets 34. The lock bar 36 is biased downwardly against sprockets 34 by springs 45 mounted on rods 44. Each end of lock bar 36 moves linearly in slot 40 of bracket 39, and it is mounted between the bifurcated end portion 47 of rod 44 by pin 48. Thus, the lock bar 36 is biased downwardly by springs 45 into locking engagement with sprockets 34 and guided for linear movement by slots 37, 40 and rods 44.

The lock bar 36 is normally biased out of engagement with the sprockets 34 by a handle 50 and control link 52 mounted to the upper end of the hand truck. A L-shaped bracket 55 is welded to a cross-member 56 secured between the upper ends of side rails 12. The upper end of control link 52 passes through elongated slot 57 and bracket 55 and is pivotally attached to handle 50 by pin 58 which passes through spacer discs 59 on both sides of control link 52. The lower end of control link 52 is pivotally connected to lock bar 36 by pin 53. The handle 50 is pivotally secured to the L-shaped bracket 55 by pivot pin 60 which extends through an inverted U-shaped mounting bracket 62. A cut-out portion 64 in the upper end of control link 52 mates with pivot pin 60 to hold the lock bar 36 out of engagement with sprockets 34.

Figure 5:
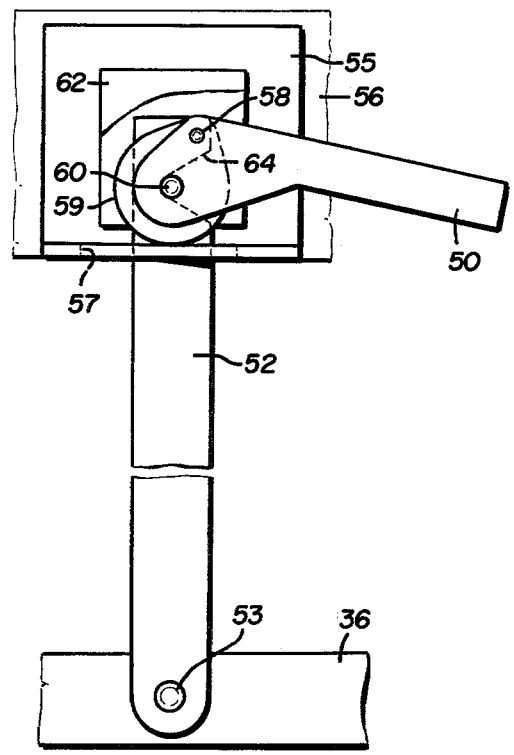
FIG. 5 is a cut-away front view of the handle arrangement shown in FIG. 4.
Figure 6:
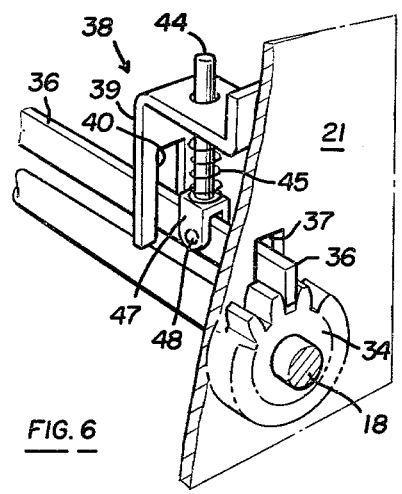
FIG. 6 is a perspective detail of the locking bar and sprocket for the locking mechanism.

In operation, the handle 50 is rotated counter-clockwise about pivot pin 60 from its position illustrated in FIG. 5 which causes the cut-out portion 64 of control link 52 to move laterally in bracket slot 57 because of the pin connection 58 between handle 50 and link 52. Link 52 moves laterally and downwardly thereby permitting the lock bar 36 to be spring biased into engagement with sprockets 34 and thereby hold the hand truck in a set inclined position.

It will be apparent to those skilled in the art that the foregoing disclosure is exemplary in nature, rather than limiting, the invention being limited only by the appended claims.

I claim:

1. A hand truck for supporting heavy loads comprising:
   an upright frame having a pair of laterally spaced side rails, each rail including a handle portion at one end and a foot portion at the other end, said foot portions being secured together by a cross-member to form a rest for supporting a load;
   a generally U-shaped shroud fixed to and covering a portion of said spaced rails, said shroud having downwardly extending leg portions, a transverse horizontal axle rotatably secured between said downwardly extending leg portions; and
   a ground engaging wheel assembly rotatably mounted to each end of said axle, each ground engaging assembly including three rubber-tired wheels mounted in an equilateral triangle configuration, said wheels being rotatably supported on axles mounted between a pair of support members, said assembly being rotatably secured at the center of said pair of support members to said axle, and lines connecting the rotational axes of said wheels forming an equilateral triangle;

said support members are Y-shaped and having legs of equal length, said wheels being rotatably connected to the free ends of said legs;

a locking mechanism being provided for holding said hand truck in a set position, said locking mechanism including a sprocket fixed on said axle inwardly of each wheel assembly and between said wheel assembly and each said downwardly extending leg, each sprocket having a plurality of locking positions for holding said hand truck in a set inclined position, a transverse horizontal lock bar mounted in slots extending through said downwardly extending legs above said sprockets, and each end of said lock bar being spring biased for engagement with said sprocket by spring biasing assemblies; and each said spring biasing assembly including a U-shaped bracket support mounted to the inside wall of said downwardly extending leg, each said end of said lock bar passing through a slot in said bracket and through said slot in said downwardly extending leg, said slots being elongated to permit said lock bar sufficient vertical movement so as to move into and out of engagement with said sprockets, each end of said lock bar being spring biased downwardly by a spring mounted on a rod mounted in said bracket, and one end of said rod being secured to said bar and its other end linearly movable in an opening in said bracket.

2. The hand truck as defined in claim 1 wherein said lock bar is normally biased out of engagement with said sprockets by a handle and control link mounted to the upper end of said hand truck, one end of said control link being pivotally attached to said handle and its other end being pivotally connected to said lock bar, said handle being pivotally attached by a pin to support structure mounted on said hand truck, said control link having a cut-out portion which mates with said pin to hold said lock bar of engagement with said sprockets.

* * * * *